Dec. 5, 1961  R. TORRESEN  3,011,785
PINFALL DETECTION AND INDICATION
Filed March 26, 1959  2 Sheets-Sheet 1

INVENTOR.
Robert Torresen
BY Hofgren, Brady,
Wegner, Allen, & Stellman
Attys.

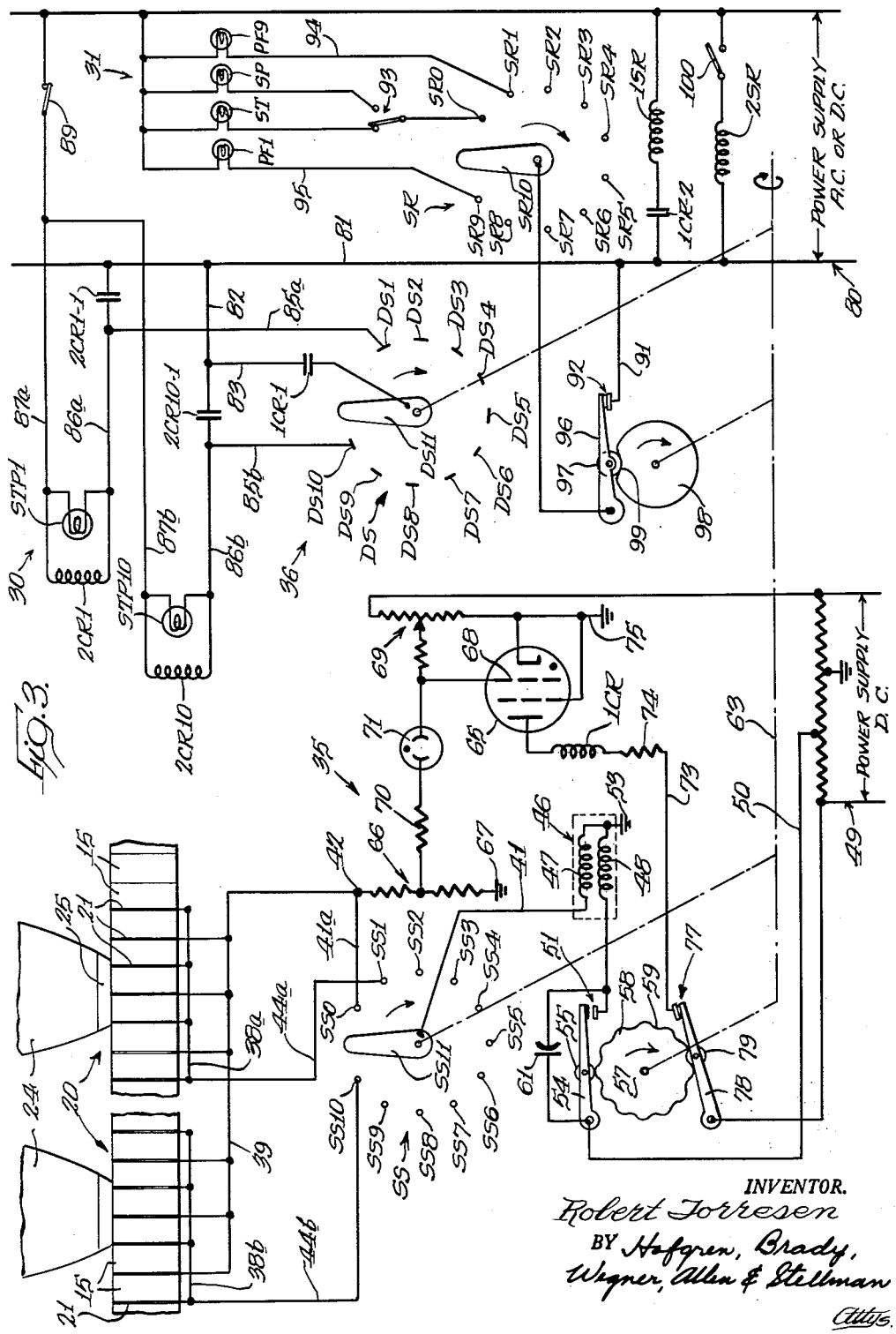

United States Patent Office 3,011,785
Patented Dec. 5, 1961

3,011,785
PINFALL DETECTION AND INDICATION
Robert Torresen, Wyckoff, N.J., assignor to The Brunswick Automatic Pinsetter Corporation, a corporation of Delaware
Filed Mar. 26, 1959, Ser. No. 802,152
30 Claims. (Cl. 273—43)

This invention relates to bowling, and more particularly to detection of pins standing or pins down after a ball is thrown for the purpose of giving a visual indication to the bowler, to a scorer, or to spectators of the results of the ball thrown.

It is a general object of the invention to provide a new and improved pin detection apparatus of the type described.

A more specific object is to provide a new and improved apparatus for detecting the presence of standing pins on a bowling alley including pin detecting means embedded in the alley at each pin spot in the form of spaced conductive elements adapted to be bridged by the conductive base portion of a standing pin, thereby to determine the presence of pins.

A further object is to provide a new and improved detecting means of the type described, wherein the conductive elements occupy an area larger than the base of a pin, thereby to detect pins standing on spot or off spot.

Another object is to provide a new and improved pin detecting apparatus of the type described including electromechanical means for scanning the several circuits through individual pin spots, that is, successively closing these circuits one at a time, and simultaneously sending a momentary high potential pulse through the circuit to check for the presence of a standing pin at each pin spot on the alley.

It is also an object of the invention to provide a new and improved apparatus of the type described including means for indicating the results of each ball thrown.

Another object is to provide a new and improved apparatus of the type described providing signals for indicating the position of standing pins after each ball, or the number of pins down after each ball, or for operating a scoring apparatus for keeping a frame to frame score.

Other objects and advantages will become readily apparent from the following detailed description taken in connection with the accompanying drawings, in which:

FIG. 3 is a diagrammatic illustration of the electromechanical apparatus according to the present invention, including detecting and indicating circuitry.

Figure 1:
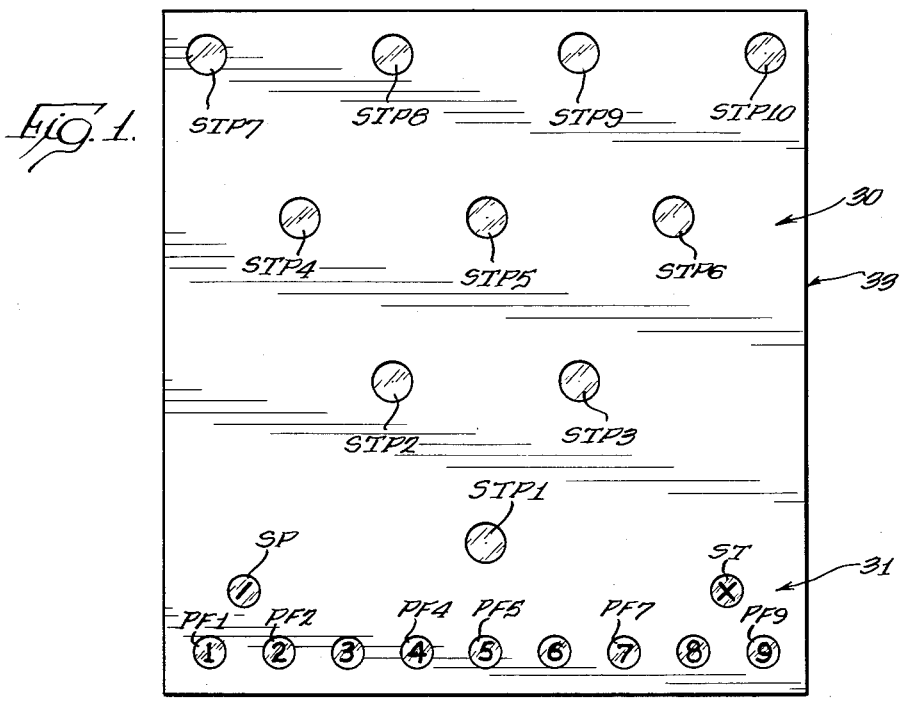
FIG. 1 is a diagrammatic illustration of an indicating panel including signal lamps for indicating the positions of standing pins after a ball is thrown, and for indicating the number of pins down after a ball is thrown, including strike and spare signals.

While an illustrative embodiment of the invention is shown in the drawings and will be described in detail herein, the invention is susceptible of embodiment in many different forms, and it should be understood that the present disclosure is to be considered as an exemplification of the principles of the invention and is not intended to limit the invention to the embodiment illustrated. The scope of the invention will be pointed out in the appended claims.

Figure 2:
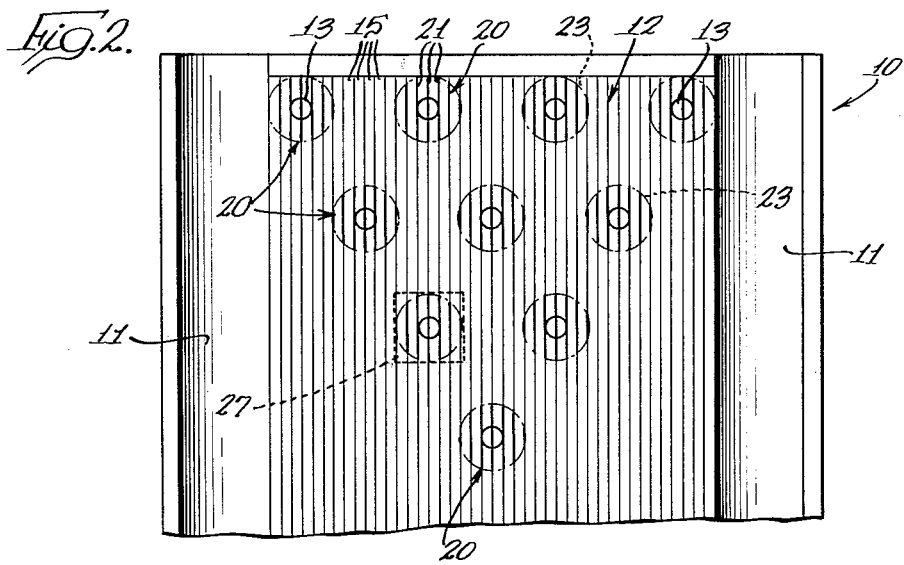
FIG. 2 is a plan view of a bowling alley having pin detecting means in the form of spaced conductive elements embedded in the alley according to the present invention.

Referring now to the drawings in more detail, FIG. 2 illustrates in plan view an end portion of a typical bowling alley 10 including gutters as at 11 and a bed 12 having ten triangularly arranged pin spots as at 13 in a conventional fashion. Normally, the alley is comprised of a plurality of laminated side by side strips as at 15 of electrically non-conductive material, usually wood, which are suitably secured together and provide a planar horizontal surface for supporting standing pins.

In many bowling establishments nowadays, automatic pinsetter machines are utilized for setting and resetting pins on the alley in proper sequence relationship to the balls thrown. During the progress of a game, it is not unusual for a pin to "walk off" a pin spot after being nudged by a ball or another pin and still remain standing so that it must be lifted from the alley while the alley is swept and then reset upon the alley preferably in the off spot position assumed. Most modern day automatic pinsetter machines include pick-up and resetting devices which are capable of lifting off spot pins within a predetermined range and resetting the pins in the off spot position.

Accordingly, in any automatically operating pinfall detecting and/or indicating apparatus, it is highly desirable to provide for detection of off spot pins within the range of the pick-up devices as well as detection of pins which remain on spot, or otherwise an inaccurate indication of the results will follow. As shown in FIGS. 2 and 3, a pin detecting means is included in the alley construction and provision is made for detecting pins standing either on spot or off spot within a predetermined range, usually a range corresponding to that of the pinsetter pick-up devices. Each pin detecting means is identified generally by the reference number 20, and includes a plurality of thin electrically conductive plates 21, such as metal foil, embedded in the alley as by insertion between the wood or other strips 15 comprising the laminae of the bed. The plates are spaced apart a distance approximately equal the radius of a bowling pin base, preferably not exceeding the radius of the base so that a standing pin having a conductive base portion may easily bridge at least two of the plates. As shown most clearly in FIG. 2, the plates are arranged to cover a circular area indicated by the broken line circles 23. Preferably, the circle has a diameter equal to about three times the diameter of a pin base so that a pin may move completely off spot in any direction and its presence will still be detected.

As shown best in FIG. 3, the metal plates or strips 21 are disposed on edge and have their upper edges substantially flush with the top surface of the alley to be substantially engaged by the conductive base portion of a pin standing in the area. Modern day pin construction frequently comprises a bowling pin having a main body portion as at 24 with an attached plastic insert ring at the base as at 25 for assuming the brunt of wear and impact in use. Such plastic inserts may include metallic powder or particles sufficient to render the insert conductive for the purposes of the present invention without substantially altering the quality or physical characteristics of the pin as a whole. Alternatively, a thin metal ring may be molded on the inside diameter of the plastic ring with its bottom edge flush with the pin base.

While a preferred relative size and shape of the pin detecting area has been illustrated in FIG. 2, it will be understood that the size and the shape of the area may readily be altered to conform to the desires or necessities of a particular installation without departing from the scope of the invention. For example, the pin detecting area may cover a square or rectangular portion of the alley at each pin spot as illustrated by the broken line box 27 in FIG. 2. In manufacturing an alley which includes detecting means of the type shown and described herein, the metallic plates or foil strips may be inserted between the individual laminae of the bed in the positions shown, or in an alternative construction the pin detecting portions of the alley may comprise individual circular inserts manufactured separately from the alley and each inserted in the position shown individually and retained in position by any suitable means. It will be understood that the alley, except for the foil strip, may comprise any electrically non-conductive material, such as wood or molded plastic, for example.

According to the present invention, the detecting means shown and described is utilized to indicate the results of each ball thrown. The indicating or signaling means for apprising the bowler of the results takes the form of a first indicating means generally designated at 30 for showing the positions of standing pins remaining after a ball is thrown and a second indicating means generally designated 31 for indicating the number of pins down after each ball is thrown including an indication of strikes and spares.

As will be understood on reference to FIG. 1, the standing pin indicator 30 includes a triangular arrangement of 10 signal lamps designated STP1 through STP10 corresponding to the positions of pin spots 13 on the alley. These lamps may be suitably arranged in an upright indicating panel 33 of a suitable nature and are included in a circuit arrangement shown in FIG. 3 to be described.

The pinfall indicating means 31 includes 11 signal lamps which may be suitably arranged in the panel means 33 and which are a strike lamp ST, a spare lamp SP and nine pinfall lamps PF1 through PF9, each of these lamps also being connected in an electric circuit arrangement illustrated in FIG. 3.

Referring to FIG. 3, the circuitry illustrated includes a pin detecting and signaling portion 35 at the left side of the figure and an indicating portion 36 at the right side of the figure. The detecting circuitry, of course, includes the ten individual pin detecting means 20, though for purposes of simplification only two of the individual detecting means are illustrated as these will enable an understanding of the invention. The indicating circuitry at the right of FIG. 3 includes the ten standing pin lamps STP1 through STP10, though only two of these, STP1 and STP10, have been illustrated. Strike lamp ST, spare lamp SP, and pinfall lamps PF1 through PF9 are included in the indicating circuit but several of the pinfall lamps have been omitted in order to simplify the drawing.

Referring now to the individual pin detecting means 20 as illustrated in elevation in FIG. 3, each of these includes a plurality of individual plates 21, approximately 7, and alternate ones of the plates 21 are connected in parallel with each other and to a common wire as at 38a and 38b so that these may be connected to one side of a circuit. The remaining, intervening plates 21 are in parallel with each other and these are each connected to a wire as at 39 which may be described as the other side of the circuit. Thus, the two groups of plates 21 in effect constitute two switch contacts adapted to be bridged by the conductive base portion of a standing pin. The several switches corresponding to the ten pin spots are connected in series with a scanning switch SS in turn connected with a source of electrical energy so that as the scanning switch is operated a signal will be produced through each of the pin spots on which a pin is standing. The signals produced are utilized for operating the indicating means.

The scanning switch SS comprises stationary switch contacts SS0 through SS10, and a rotary scanning switch contact SS11 having a normal "home" position as illustrated at which there is no stationary switch contact, the rotary contact being movable in a clockwise direction to successively register with the stationary contacts. Because of the high potential pulse as will be explained, actual contact between rotary contacts and stationary contacts is not necessary. The rotary switch contact is connected to a source of electrical power by a wire as at 41, and the stationary switch contacts are connected to impart signals for operating the indicating means. In the event that all standing pins are removed by the ball thrown, there will be no signals passing through the pin spots as the scanning switch is operated. Accordingly, in order to provide a signal for operating the strike and spare lamps, as will be explained in detail presently, the first stationary switch contact SS0 is connected, not through the pin detecting switches 20, but by means of a wire 41a directly to a terminal 42. The remaining switch contacts SS1 through SS10 are connected through the ten pin spots respectively as by the wires 44a and 44b which connect to the wires 38a and 38b respectively. The wire 39 leading from the several pin spots is connected to the terminal 42.

In alley constructions usually consisting of wood, the surface of the alley is commonly covered with hard finishes, alley dressings, dust and the like, and indentations frequently develop in the alley surface due to ball and pin impacts. For this reason, it will be understood that it may be rather difficult to maintain at all times an actual engagement between the plates 21 and a pin base 25. Accordingly, a relatively high voltage is provided at the pin detecting switches in the alley to insure that a signal will be transmitted through the switch when a pin is standing, regardless of imperfections. Preferably, in order to obtain the necessary signals without creating a dangerous condition, the circuit provides high potential pulses of short duration such that the total energy is limited to an amount incapable of causing a fire or shock hazard.

The high potential low energy pulses are provided by an inductor 46 having a secondary 47 connected to the wire 41 in circuit with the rotary scanning switch contact and having a primary 48 connected in circuit with a suitable D.C. power supply as at 49. The power supply is connected to the primary 48 by a wire 50 and the primary is connected to ground as at 53. In operation, a switch 51 in wire 50 includes a movable contact on a pivoted arm 54 having a roller 55 engageable with the periphery of a rotary cam 57 having an undulated periphery consisting of alternate rises and falls including high portions 58 and low portions 59. When the roller 55 engages the low portions 59, the switch 51 is closed and the coil 48 energized. When the highs 58 engage the roller 55 the switch 51 is opened, breaking the circuit to the primary 48. When the circuit to the primary 48 is interrupted, the interruption takes place with extreme suddenness due to the provision of a capacitor 61 in parallel around the switch 51 which suppresses the arc when the switch contacts open. Due to the resulting sudden decay of flux, a relatively high potential is induced in the secondary coil 47.

In an actual installation, the rotary scanning switch contact SS11 and the rotary cam 57 are driven from a common source, and preferably both are mounted on the same shaft illustrated diagrammatically at 63 so that the two operate in timed relationship such that the scanning switch contacts are successively closed as the high potential pulse is generated in the inductor 46. The shaft 63 is driven through a single revolution for each detecting and indicating cycle.

The pulses thereby generated and passing through any standing pin are utilized by a circuit including a thyratron tube 65 which is triggered by the pulses to render the tube conducting in order to obtain energization of a control relay 1CR. The high potential positive pulse is reduced to an operable value by a voltage divider 66 which dissipates most of the voltage through a ground 67. A negative bias is connected to the thyratron control grid 68 from the power supply 49 and the bias is preferably adjustable by a potentiometer 69. The positive pulse generated by the inductor 46 and reduced by the voltage divider 66 is sufficient to overcome the negative bias on the control grid 68. The connection between the voltage divider and the control grid is made through a resistor 70 and a neon glow tube 71 which serve to isolate the positive pulsing system and the negative biasing system.

When a pulse through the scanning switch renders the tube 65 conducting, the control relay 1CR is thereby energized through a wire 73, a resistor 74 which serves to limit current in this circuit to a value best suited for operation of the coil, and a ground connection as at 75. The wire 73 is connected to the source 49 through a switch 77 including a movable contact on a pivoted arm 78 having a roller 79 also engageable with the periphery of cam 57 so that the switch 77 closes before the tube 65 is triggered thereby to obtain energization of coil 1CR and opens immediately thereafter to deenergize the coil and restore the thyratron to a non-conducting state in preparation for the next pulse.

As will be described, coil 1CR includes switch contacts in the indicating circuit for obtaining operation of such signal lamps as are required by the number of pins standing or fallen on the alley.

The indicating circuits include a suitable power supply as at 80 for supplying power through a distributing switch DS to the circuits for lamps STP1 through STP10. The distributing switch DS includes a rotary distributing switch contact DS11 which is connected to the power supply by a wire 81, a wire 82, and a wire 83 which includes normal open contacts 1CR-1 which are controlled by the control relay coil 1CR and which are closed when the coil is energized, thereby to connect the contact DS11 with the power supply. The distributing switch also includes 10 stationary switch contacts DS1 through DS10 which are connected respectively to wires as at 85a and 85b in turn connected to wires as at 86a and 86b in circuit with the standing pin indicating lamps as at STP1 and STP10. The circuit from the lamps is completed through wires as at 87a and 87b. The rotary switch contact DS11 is preferably also driven by the shaft 63, so that contact DS11 rotates synchronously with the contact SS11 and the cam 57.

In operation, the rotary contact DS11 has a "home" or starting position as illustrated at which there is no switch contact, and the switch DS has no contact corresponding to the first contact SS0 in the scanning switch SS. During rotation of the cam 57, the power pulses described are provided and pass successively through successive contacts of the scanning switch. The first pulse passes through the contact SS0 to energize coil 1CR, but because the switch DS has no contacts comparable to that at SS0, no action is produced through the distributing switch DS. Successive pulses through the scanning switch pass to the pin spots, and for each pin standing there is an energization and a deenergization of the coil 1CR. Synchronously with the pulses, the contacts in switch DS are closed to obtain energization of each STP lamp for which there is a pin standing. In parallel with each STP lamp, there is a holding relay as at 2CR1 and 2CR10. These relays are effective to close normally open contacts as at 2CR1-1 and 2CR10-1 to provide a holding circuit to maintain the lamps STP energized after the scanning switch contact DS11 has passed the stationary contacts.

The lamps STP preferably may remain energized for whatever period is desired. In a preferred arrangement, these lamps remain energized while the next ball is thrown and until such time as another detecting cycle is initiated. The lamps may be deenergized as by means of a normally closed switch as at 89 which may be opened in any suitable manner at the beginning of the next detecting cycle.

The strike lamp, the spare lamp, and the pinfall lamps PF are energized by the power supply 80 through the wire 81, a wire 91 including a switch 92, and the switch contacts of a stepping relay SR of a conventional type. The wire 91 is connected to the rotary switch contact SR10 of the stepping relay which is successively engageable with the stationary contacts SR0 through SR9. Switch contact SR0 is connected to a selector switch 93 having a first position as illustrated for energizing the strike lamp ST and a second position for energizing the spare lamp SP. The remaining stationary contacts SR1 through SR9 are connected respectively to the pinfall lamps PF9 through PF1 as by wires 94 and 95.

The switch 92 includes a movable switch contact carried by an arm 96 having a roller 97 engageable with a rotary cam 98 which is preferably driven by the shaft 63 and therefore rotates in unison with the scanning switch, the distributing switch and the cam 57 so that the circuit to the strike lamp, the spare lamp and the pinfall lamps is broken during the scanning period to avoid flashing these lamps, but is energized after one revolution when the roller 97 drops in a recess 99.

The stepping relay SR includes an actuating coil 1SR connected across the power supply and in circuit with normally open switch contactcs 1CR2 which are closed on energization of control relay coil 1CR. Each energization of the coil 1SR steps the rotary switch contact SR10 through 1/11 of a revolution.

In operation, if all pins have been felled, the coil 1CR will be energized only once, through the medium of contact SS0 and the stepping relay will be energized only once to thereby energize the strike or the spare lamp depending on the position of switch 93.

For each pin standing on the alley, the rotary switch contact SR10 will be moved an additional step, and assuming one pin remains standing contact SR10 will move no further than contact SR1 and pinfall lamp PF9 will be energized to indicate 9 pins down. If nine pins remain standing, contact SR10 will stop on contact SR9 to energize the pinfall lamp PF1, indicating one pin down. In this manner, pins standing are utilized to indicate pins down.

At the beginning of the subsequent pin detecting cycle, a normally open switch as at 100 may be closed to energize a coil 2SR which advances the switch contact SR10 to its home position. Use may be made of other conventional stepping relays which include other means for returning the movable contact to its home position.

In use, it is usually desirable that the pin detecting and indicating apparatus described be operated automatically following the balls thrown. Automatic operation may be obtained by having the one revolution shaft 63 as a part of an automatic pinsetter or operated from an automatic pinsetter. Alternatively the shaft may be independent of a pinsetter and operated by a separate motor made responsive to balls thrown. Switches 89, 93 and 100 may be controlled by similar means. Preferably, the switches 89 and 100 are parts of a single multiple contact switch. If desired, signals may be taken from the contacts SR0–SR9 for operating an automatic scorekeeping mechanism (not shown).

I claim:

1. Means for detecting the presence of a standing bowling pin with an electrically conductive base portion at a circular pin spot on an alley comprised of laminated longitudinal side-by-side strips of electrically non-conductive material each having a width less than the diameter of said pin base and together providing a planar horizontal support for bowling pins, comprising, a plurality of thin longitudinal electrically conductive plates disposed on edge between said strips at the pin spot and extending at least from one edge to the other of the circular pin spot adjacent the top surface of the alley to be bridged by a conductive pin base portion, and an electric detecting circuit having said plates connected therein and adapted to be closed by said conductive pin base portion.

2. In a bowling alley comprised of electrically non-conductive material providing a planar horizontal support for bowling pins at spaced pin spots thereon, means for detecting the presence of a standing pin with an electrically conductive base portion at each pin spot, comprising, a plurality of elongate thin electrically conductive plates of metal foil embedded in the alley at each pin spot, disposed on edge, spaced apart approximately, but slightly less than, the radius of a pin base, and positioned adjacent the top surface of the alley to be bridged by a conductive pin base portion, wiring connecting alternate ones of said plates at each pin spot in one side of a detecting circuit, wiring connecting the remaining intervening plates at each pin spot in the opposite side of said detecting circuit, opposite sides of the circuit through each pin spot adapted to be connected by a standing pin on the pin spot.

3. In a bowling alley comprised of electrically non-conductive material providing a planar horizontal support for bowling pins at spaced pin spots thereon, means for detecting the presence of a standing pin with an electrically conductive base portion in an area at each pin spot including the pin spot and a predetermined off spot vicinity immediately surrounding the pin spot, comprising, a plurality of elongate parallel thin electrically conductive plates embedded in the alley at each pin spot throughout each of said areas, spaced apart no more than the radius of a bowling pin base and including portions adjacent the top surface of the alley adapted to be bridged by an electrically conductive pin base portion, wiring at each pin spot connecting alternate ones of said electrically conductive plates in parallel, wiring at each pin spot connecting the remaining, intervening electrically conductive plates in parallel, and a detecting circuit for each pin spot including said wiring adapted to be closed by a standing pin.

4. Means for detecting the presence of standing pins on a bowling alley, comprising, a plurality of pin detecting switch means positioned in a pattern corresponding to the positions of pin spots on the alley and each adapted to be closed by a pin standing at the spot, a pin detecting circuit including said switch means, an electrical power supply in said circuit connected in open series circuit with said switch means, means for momentarily closing the circuit between the power supply and said switch means individually in succession to check for standing pins, and means for utilizing a pulse from said power supply when said switch means is closed.

5. Means for detecting the presence of standing pins on a bowling alley after a ball has been thrown, comprising, a plurality of separate pin detecting switch means positioned in a pattern corresponding to the positions of pin spots on the alley and each adapted to be closed by a pin standing at the spot, an electrical power supply, an electric circuit including wiring connecting each switch means in open series circuit with the supply, means for momentarily closing the circuit between the supply and the switch means including a scanning switch for successively connecting the supply to each switch means, and means for utilizing pulses from said power supply corresponding to each switch means closed.

6. Means for detecting the presence of standing pins on a bowling alley after a ball has been thrown, comprising a plurality of pin detecting switch means positioned in a pattern corresponding to the positions of pin spots on the alley and each adapted to be closed by a pin standing at the spot, a pin detecting circuit connecting said switch means in parallel with each other, an electrical power supply in said circuit connected in series with the switch means including means for providing a momentary high potential, low energy power pulse to each pin detection switch means in succession to check for standing pins, and means for utilizing the pulses when any of said switch means is closed.

7. The combination of claim 6, wherein the last recited means includes an indicating means for signaling the results after a ball is thrown, and a relay responsive to the pulses for energizing the indicating means.

8. The combination of claim 6, wherein said pin detecting switch means each comprises, a pair of electrically conductive elements embedded in the alley at each pin spot adapted to be bridged by an electrically conductive base portion of a pin standing at the spot.

9. Means for detecting the presence of standing pins on a bowling alley after a ball has been thrown, comprising, a plurality of separate pin detecting switch means positioned in a pattern corresponding to the positions of pin spots on the alley and each adapted to be closed by a pin standing at the spot, an electrical power supply including means for providing a series of momentary power pulses, an electric circuit including wiring connecting each switch means in open series circuit with the power supply, means for momentarily closing the circuit between the supply and the switch means including a scanning switch for successively connecting the power supply to the individual switch means in time with the power pulses, and means for utilizing pulses from said power supply corresponding to each switch means closed.

10. The combination of claim 9, wherein said pin detecting switch means each comprises a plurality of thin electrically conductive plates embedded in the alley at each pin spot, disposed on edge, and positioned adjacent the top surface of the alley to be bridged by an electrically conductive base portion of a pin standing at the pin spot, wiring connecting alternate ones of said plates at each pin spot in parallel with each other and in series with said scanning switch, and wiring connecting the remaining intervening plates at each pin spot in parallel with each other and in series with said means for utilizing pulses.

11. The combination of claim 9, wherein the means for utilizing pulses includes a source of power, a control relay having a coil connected in circuit with the source, and a thyratron tube in said circuit including a grid connected in circuit with said pin detection switch means to render the tube conducting with each pulse through the pin detecting switches, thereby to energize the relay coil.

12. The combination of claim 9, wherein said pin detecting switch means each comprises, a pair of electrically conductive elements embedded in the alley at each pin spot adapted to be bridged by an electrically conductive base portion of a pin standing at the spot.

13. The combination of claim 12 wherein said power supply comprises a source of power, an inductor including a primary connected in series with said source and a secondary connected in series with said scanning switch, a switch between the source and the primary operable to alternately make and break the circuit between the source and the primary thereby to induce a power pulse in the secondary, and means for operating said last recited switch and said scanning switch in timed relationship.

14. The combination of claim 13, including a capacitor wired in parallel with said last recited switch for suppressing the arcing when the switch is opened thereby to induce a high potential low energy pulse in the secondary.

15. The combination defined in claim 13, wherein the means for utilizing pulses includes a control relay having a coil connected in circuit with said source, a switch between the source and the relay coil, a thyratron tube in circuit with the coil including a grid in circuit with the pin detecting switch means to render the tube conducting with each pulse through the pin detecting switches, and means for operating the scanning switch, the switch between the source and the inductor, and the switch between the source and relay coil in timed relationship to energize the coil with each pulse through the pin detecting switch means.

16. The combination of claim 13, wherein said scanning switch comprises a plurality of stationary switch contacts connected in parallel with each other and connected respectively in series with said pin detecting switch means, and a rotary scanning switch contact engageable successively with said stationary switch contacts, and including a rotary cam for alternately closing and opening the switch between said source and said inductor primary, and a common drive means for rotating said rotary switch contact and said rotary cam synchronously.

17. Means for detecting the presence of standing pins on a bowling alley and indicating the results after a ball has been thrown, comprising, a plurality of separate pin detecting switch means positioned in the alley at the pin spots, each adapted to be closed by a pin standing at the spot, an electrical power supply including means for providing a series of momentary high potential low energy power pulses, an electric circuit including wiring connecting each switch means in open series circuit with the power supply, means for momentarily closing the circuit between the supply and the switch means including a scanning switch for successively connecting the power supply to the individual switch means in timed relationship with the power pulses, indicating means for signaling the results after a ball is thrown, and control means in circuit with said pin detecting switch means for energization by pulses corresponding to each switch means closed in turn to energize the indicating means.

18. Means for detecting the presence of standing pins on a bowling alley and indicating the results after a ball is thrown, comprising, a plurality of separate pin detecting switch means positioned in the alley at the pin spots, each comprising a plurality of electrically conductive elements adapted to be bridged by an electrically conductive base portion of a pin standing at the spot, an electrical power supply including means for providing a series of momentary high potential low energy pulses, an electric circuit including wiring connecting each switch means in open series circuit with the power supply, means for momentarily closing the circuit between the supply and the switch means including a scanning switch for successively connecting the power supply to the individual switch means in timed relationship with the power pulses, a control relay having a coil energized in response to power pulses through each switch means closed, signal lamps for indicating the position of pins standing after a ball is thrown, means controlled by said relay for energizing said signal lamps, signal means for indicating the number of pins down after a ball is thrown, and means controlled by said relay for energizing said signal means.

19. Means for detecting the presence of standing pins on a bowling alley and indicating the results after a ball has been thrown, comprising: a plurality of separate pin detecting means corresponding to the pin spots on the alley and each adapted to sense a pin standing at the spot, means providing a source of electric power, an electric circuit connecting each detecting means in series with the source, a scanning switch for successively connecting the source to the individual detecting means to produce a signal for each pin standing, a control relay having a coil energizable in response to each signal from the detecting means; a plurality of signal lamps corresponding to the pin spots on the alley, a power supply, a circuit including a distributing switch for successively connecting the power supply to the individual lamps, switch contacts in the circuit between the power supply and the distributing switch operable by said control relay coil; and means for operating the scanning switch and distributing switch synchronously to energize a lamp corresponding to each standing pin.

20. The combination of claim 19, including a holding circuit for each lamp in parallel with the distributing switch, a relay in parallel with the lamp including switch contacts in said holding circuit closed on energization of each lamp and its associated holding relay, and in circuit with each lamp, normally closed switch means capable of operation at the end of each indicating cycle to deenergize the lamps.

21. The combination of claim 19, wherein the scanning switch comprises a plurality of stationary switch contacts one in circuit with each pin detecting means, and a rotary scanning switch contact in circuit with the source and engageable successively with the stationary switch contacts; wherein the distributing switch comprises a plurality of stationary switch contacts one in circuit with each lamp, and a rotary distributing switch contact in circuit with the power supply and engageable successively with the stationary switch contacts; and including a common drive shaft for rotating both rotary switch members.

22. The combination of claim 21, wherein the scanning switch comprises eleven stationary switch contacts, including a first in parallel with the pin detecting means for imparting a signal to operate said control relay in the event all pins are down, and ten contacts in circuit with the pin detecting means, and wherein the distributing switch has ten switch contacts corresponding to the last ten contacts of the scanning switch and a gap corresponding to the first contact of the scanning switch.

23. Means for detecting the presence of standing pins on a bowling alley and indicating the results after a ball has been thrown, comprising: a plurality of separate pin detecting means corresponding to the pin spots on the alley and each adapted to sense a pin standing at the spot, means providing a source of electric power, an electric circuit connecting each detecting means in series with the source, a scanning switch for successively connecting the source to the individual detecting means to produce a signal for each pin standing, a control relay having a coil energizable in response to each signal from the detecting means; a plurality of signal lamps for indicating the number of pins down, a power supply, a stepping relay having an actuating coil in circuit with the power supply and having switch means for successively connecting the power supply to the individual lamps, and switch contacts in the circuit between the power supply and said actuating coil operable by said control relay coil for energizing the stepping relay once for each control relay energization.

24. The combination of claim 23 including a normally closed switch in the circuit between the power supply and the stepping relay switch means, and means operating synchronously with the scanning switch for opening said normally closed switch during operation of the scanning switch to avoid flashing pinfall signal lamps during scanning.

25. The combination of claim 23 wherein the pinfall lamps include a mark lamp for indicating ten pins down, and nine pinfall lamps; wherein said scanning switch includes a rotary switch contact connected in circuit with the source and eleven stationary contacts, including a first in parallel with the pin detecting means for producing a signal to operate the control relay if all pins are down, and ten contacts in circuit with the pin detecting means; wherein said stepping relay includes a rotary switch contact in circuit with the power supply and ten stationary contacts, a first in circuit with the mark lamp for indicating ten pins down and nine in circuit respectively with the remaining lamps.

26. The combination of claim 25 including a pair of mark lamps comprising a strike lamp and a spare lamp, and a switch capable of selective operation for alternatively connecting the strike lamp or the spare lamp to the first stationary contact of the stepping relay, depending on whether a first ball or a second ball of a frame has been thrown.

27. Means for detecting the presence of standing pins on a bowling alley after a ball has been thrown, comprising, a plurality of pin detecting switch means positioned in a pattern corresponding to the positions of pin spots on the alley and each adapted to be closed by a pin standing at the spot, a pin detecting circuit including said switch means, an electrical power supply in said circuit connected in series with the switch means including means for providing a momentary power pulse to check for standing pins, and means for utilizing the pulse when any of said switch means is closed, said power supply comprising, a source of power, an inductor including a primary connected in series with said source and a secondary connected in series with said switch means, a switch between the source and the primary operable to make and then break the circuit between the source and the primary, thereby to induce a power pulse in the secondary.

28. The combination of claim 27, including a capacitor wired in parallel with said switch.

29. Means for detecting the presence of standing pins on a bowling alley and indicating the results after a ball has been thrown, comprising: a plurality of separate pin detecting means corresponding to the pin spots on the alley and each adapted to sense a pin standing at the spot, means providing a source of electric power, an electric circuit connecting each detecting means in series with the source, a scanning switch for successively connecting the source to the individual detecting means to produce a signal for each pin standing, circuit means including a control relay having a coil energizable repeatedly in response to signals respectively from the detecting means which sense standing pins; a plurality of signal lamps corresponding to the pin spots on the alley, a power supply, a circuit including a distributing switch for successively connecting the power supply to the individual lamps, switch contacts in the circuit between the power supply and the distributing switch operable by said control relay coil; and means for operating the distributing switch in timed relationship with operation of said switch contacts to energize a lamp corresponding to each standing pin.

30. Means for detecting the presence of standing pins on a bowling alley and indicating the results after a ball has been thrown, comprising: a plurality of separate pin detecting means corresponding to the pin spots on the alley and each adapted to sense a pin standing at the spot, means providing a source of electric power, an electric circuit connecting each detecting means in series with the source, a scanning switch for successively connecting the source to the individual detecting means to produce a signal for each pin standing, circuit means including a control relay having a coil energizable repeatedly in response to signals respectively from the detecting means which sense pins standing; a plurality of signal lamps for indicating the number of pins down, a power supply, a stepping relay having an actuating coil in circuit with the power supply and having switch means for successively connecting the power supply to the individual lamps, and switch contacts in the circuit between the power supply and said actuating coil operable by said control relay coil for energizing the stepping relay once for each control relay energization.

References Cited in the file of this patent
UNITED STATES PATENTS

| | | |
|---|---|---|
| 601,626 | Brooks | Apr. 5, 1898 |
| 2,017,143 | Bentz | Oct. 15, 1935 |
| 2,646,984 | Patterson | July 28, 1953 |
| 2,652,252 | Alexander | Sept. 15, 1953 |
| 2,673,637 | Collins et al. | Mar. 30, 1954 |
| 2,890,886 | Dumas | June 16, 1959 |